United States Patent
Kimpara et al.

(10) Patent No.: US 9,630,649 B2
(45) Date of Patent: Apr. 25, 2017

(54) ELECTRIC POWER STEERING CONTROL DEVICE AND CONTROL METHOD FOR SAME

(71) Applicant: Mitsubishi Electric Corporation, Tokyo (JP)

(72) Inventors: Yoshihiko Kimpara, Tokyo (JP); Akira Furukawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/781,330

(22) PCT Filed: May 15, 2013

(86) PCT No.: PCT/JP2013/063563
§ 371 (c)(1),
(2) Date: Sep. 30, 2015

(87) PCT Pub. No.: WO2014/184900
PCT Pub. Date: Nov. 20, 2014

(65) Prior Publication Data
US 2016/0031477 A1    Feb. 4, 2016

(51) Int. Cl.
*B62D 5/04* (2006.01)
(52) U.S. Cl.
CPC ......... *B62D 5/0463* (2013.01); *B62D 5/0472* (2013.01)
(58) Field of Classification Search
CPC ... B62D 5/0463; B62D 5/0472; B62D 5/0466
See application file for complete search history.

(56) References Cited

U.S. PATENT DOCUMENTS

2009/0112406 A1    4/2009  Fujii et al.
2012/0232759 A1*   9/2012  Oniwa ............... B62D 5/0463
                                                    701/41

FOREIGN PATENT DOCUMENTS

| JP | 2000-168600 A | 6/2000 |
| JP | 2006-131179 A | 5/2006 |
| JP | 2008-183990 A | 8/2008 |
| JP | 2009-101930 A | 5/2009 |

OTHER PUBLICATIONS

International Search Report of PCT/JP2013/063563 dated Jul. 30, 2013 [PCT/ISA/210].

* cited by examiner

Primary Examiner — Yuen Wong
(74) Attorney, Agent, or Firm — Sughrue Mion, PLLC; Richard C. Turner

(57) ABSTRACT

The electric power steering control device includes: a steering wheel; a torque generation unit for generating a generated torque for assisting a torque generated by steering by a driver; a torque detection unit for detecting a torsion generated between the steering wheel side and the torque generation unit side as a detected torque; an assist torque command calculation unit for calculating, based on the detected torque, an assist torque command for assisting the steering by the driver; and a differential rotational speed calculation unit for calculating a difference in a rotational speed generated between the steering wheel side and the torque generation unit side as a differential rotational speed, in which the torque generation unit generates the generated torque based on a compensation torque, which is set depending on the assist torque command and the differential rotational speed.

8 Claims, 12 Drawing Sheets

ELECTRIC POWER STEERING CONTROL DEVICE AND CONTROL METHOD FOR SAME

CROSS REFERENCE TO RELATED APPLICATIONS

This application is a National Stage of International Application No. PCT/JP2013/0603563 filed May 15, 2013, the contents of all of which are incorporated herein by reference in their entirety.

TECHNICAL FIELD

The present invention relates to an electric power steering control device for using a torque generation unit to generate an assist torque for assisting a steering torque by a driver, and a control method for the same.

BACKGROUND ART

When steering a vehicle, a steering torque is required, and hence there is employed an electric power steering control device. In the electric power steering control device, a motor (rotation machine) or the like is mounted to a steering shaft for generating an assist torque, and the assist torque generated by the motor or the like is used to assist the torque for steering by a driver.

On this occasion, the assist torque generated by the motor or the like is set so as to be approximately proportional to the steering torque. As a result, for the same rotational speed, when a proportional gain with respect to the steering torque increases, the steering torque decreases, and when the proportional gain decreases, the steering torque increases. In other words, in order to use a low steering torque to effectively rotate a steering wheel, the proportional gain needs to be high.

On the other hand, if the proportional gain is excessively high, phenomena such as a vibration and an oscillation of the steering wheel tend to occur. The vibration of the steering wheel leads to a sense of discomfort during the steering, the oscillation leads to an unstable behavior, and hence it is desired to suppress the vibration and the oscillation. Thus, there has been proposed a method of superimposing a compensation current for cancelling the vibration, oscillation, and the like of the steering wheel (hereinafter generally referred to as "vibration") on a target current for the motor.

As such a method, in a related-art electric power steering control device, the vibration of the motor rotational speed is suppressed by removing a speed component by the steering from the detected motor rotational speed to extract a vibration component of the motor rotational speed, thereby calculating a damping current for suppressing the vibration component of the motor rotational speed (for example, refer to Patent Literature 1).

CITATION LIST

Patent Literature

[PTL 1] JP 2000-168600 A

SUMMARY OF INVENTION

Technical Problem

However, the related art has the following problems.

The electric power steering control device disclosed in Patent Literature 1 calculates the damping current by feeding back the vibration component of the motor rotational speed so as to suppress the vibration of the motor rotational speed. As a result, the vibration component included in the motor rotational speed is suppressed.

On this occasion, in the electric power steering control device, a difference (differential rotational speed) in the rotational speed is generated between a steering wheel side and a torque generation unit (such as the motor) side on both sides of a torque detection unit (such as a torque sensor) for detecting a steering torque.

Therefore, the differential rotational speed between the steering wheel side and the torque generation unit side cannot be suppressed only by suppressing the vibration of the rotational speed (motor rotational speed) on the torque generation unit side, and hence there is such a problem that when the steering wheel is turned back, the driver feels uncomfortable torque vibration.

The present invention has been made in view of the above-mentioned problem, and therefore has an object to provide an electric power steering control device and a control method for the same, which are capable of suppressing a torque vibration generated by a differential rotational speed between a steering wheel side and a torque generation unit side by suppressing the differential rotational speed between the steering wheel side and the torque generation unit side.

Solution to Problem

According to one embodiment of the present invention, there is provided an electric power steering control device, including: a steering wheel to be operated by a driver; a torque generation unit for generating a generated torque for assisting a torque for steering by the driver; a torque detection unit provided between the steering wheel and the torque generation unit, for detecting a torsion generated between the steering wheel side and the torque generation unit side as a detected torque; an assist torque command calculation unit for calculating, based on the detected torque, an assist torque command for assisting the steering by the driver; and a differential rotational speed calculation unit for calculating a difference in a rotational speed generated between the steering wheel side and the torque generation unit side as a differential rotational speed, in which the torque generation unit generates the generated torque based on a compensation torque, which is set depending on the assist torque command and the differential rotational speed.

Further, according to one embodiment of the present invention, there is provided a control method for an electric power steering control device, including: a torque detection step of detecting, as a detected torque, a torsion generated between a steering wheel steered by a driver and a torque generation unit for generating a generated torque for assisting a torque generated by steering by the driver; an assist torque command calculation step of calculating, based on the detected torque, an assist torque command for assisting the steering by the driver; a differential rotational speed calculation step of calculating a difference in a rotational speed generated between the steering wheel side and the torque generation unit side as a differential rotational speed; and a torque generation step of generating the generated torque based on a compensation torque, which is set depending on the assist torque command and the differential rotational speed.

Advantageous Effects of Invention

According to the electric power steering control device and the control method for the same of the one embodiment of the present invention, the torque generation unit (step) generates the generated torque based on the assist torque command for assisting the steering by the driver, and the compensation torque set depending on the differential rotational speed, which is the difference in the rotational speed generated between the steering wheel side and the torque generation unit side.

Therefore, it is possible to suppress the torque vibration generated by the differential rotational speed between the steering wheel side and the torque generation unit side by suppressing the differential rotational speed between the steering wheel side and the torque generation unit side.

DESCRIPTION OF EMBODIMENTS

Figure 1:
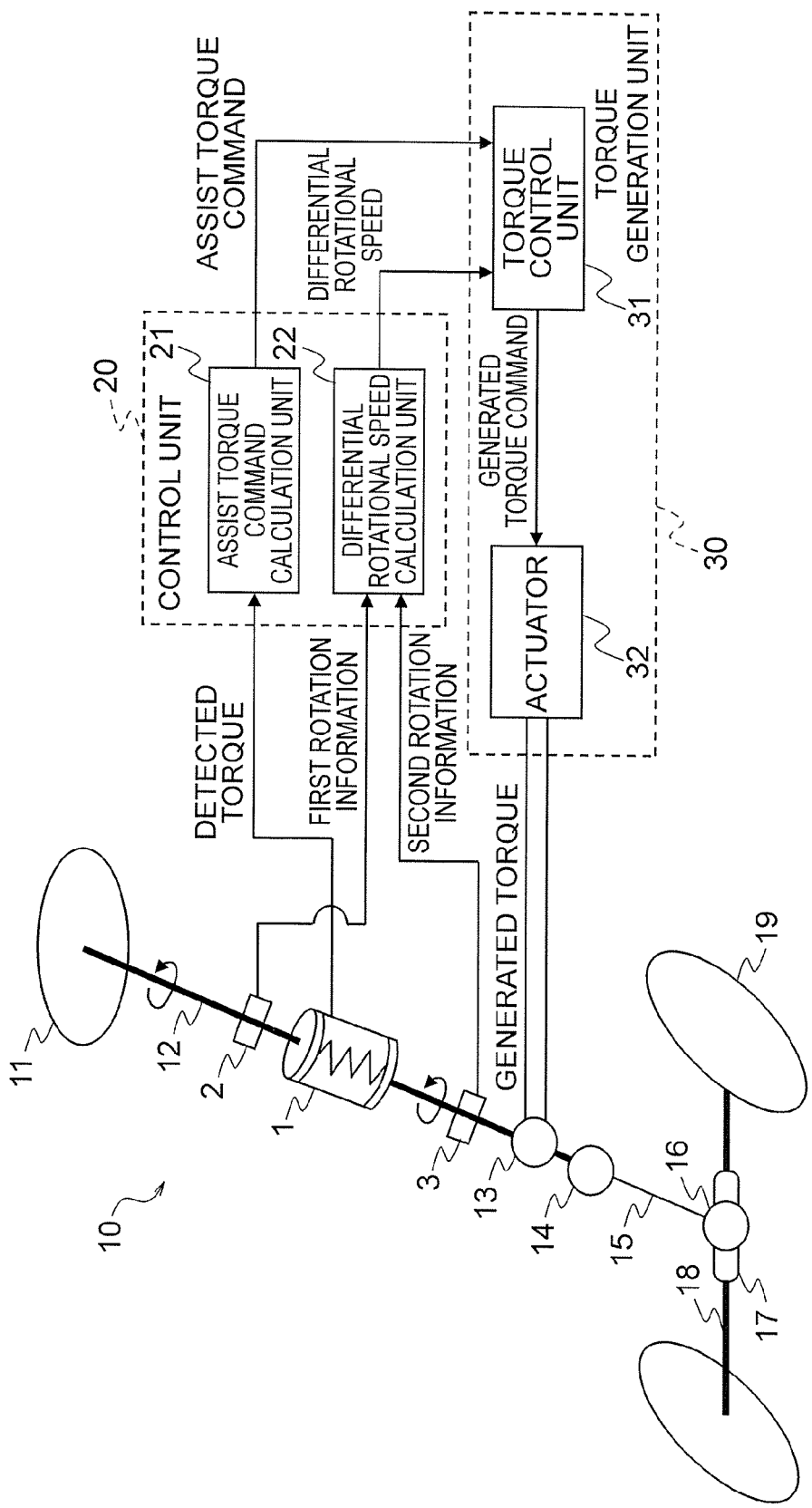
FIG. 1 is a schematic diagram for illustrating an overall configuration of an electric power steering control device according to a first embodiment of the present invention.

A description is now given of an electric power steering control device and a control method for the same according to exemplary embodiments of the present invention referring to the drawings, and throughout the drawings, like or corresponding components are denoted by like reference numerals to describe those components.

Note that, in the following respective embodiments, as the electric power steering control device, a description is given of an electric power steering control device of a column type as an example, but the present invention is not limited thereto. The electric power steering control device may be of a publicly known pinion type, dual pinion type, rack type, or electric hydraulic type.

First Embodiment

FIG. 1 is a schematic diagram for illustrating an overall configuration of an electric power steering control device according to a first embodiment of the present invention. In FIG. 1, as the electric power steering control device, a power steering control device of the column type is schematically illustrated.

In FIG. 1, this electric power steering control device includes a steering mechanism 10, a torque detection unit 1 (such as a torque sensor), a first rotation information detection unit 2, a second rotation information detection unit 3, a control unit 20, and a torque generation unit 30.

In the steering mechanism 10, when a driver steers a steering wheel 11 clockwise or counterclockwise, a first shaft 12 rotates by an amount of the rotation of the steering wheel 11. On this occasion, the rotation of the first shaft 12 is assisted by the torque generation unit 30 via gears 13. The rotation of the first shaft 12 is transmitted to the second shaft 15 via a joint 14.

The rotational motion of the second shaft 15 is converted into a linear motion by a pinion 16, and is transmitted to a rack 17. At this time, when the rack 17 moves in an axial direction, tie rods 18 also move in the axial direction. As a result, tires 19 are turned back.

The torque detection unit 1 is provided between the steering wheel 11 and the torque generation unit 30 (gears 13). While the driver is operating the steering wheel 11, a torsion is generated between a steering wheel side and a torque generation unit side on both sides of the torque detection unit 1, and a difference in a rotational position is generated. The torque detection unit 1 detects this torsion, and outputs the torsion to the control unit 20 as a detected torque.

The first rotation information detection unit 2 detects rotation information on the steering wheel side when the driver steers the steering wheel 11, and outputs the rotation information to the control unit 20 as first rotation information. The second rotation information detection unit 3 detects rotation information on the torque generation unit side when the driver steers the steering wheel 11, and outputs the rotation information to the control unit 20 as second rotation information.

The control unit 20 calculates an assist torque command and a differential rotational speed based on the detected torque, the first rotation information, and the second rotation information output respectively from the torque detection unit 1, the first rotation information detection unit 2, and the second rotation information detection unit 3, and outputs the assist torque command and the differential rotational speed to the torque generation unit 30. The control unit 20 includes an assist torque command calculation unit 21 and a differential rotational speed calculation unit 22.

The assist torque command calculation unit 21 calculates the assist torque command for assisting the steering by the driver based on the detected torque from the torque detection unit 1. The differential rotational speed calculation unit 22 calculates the differential rotational speed between the steering wheel side and the torque generation unit side of the torque detection unit 1 based on the first rotation information and the second rotation information from the first rotation information detection unit 2 and the second rotation information detection unit 3.

Specifically, for example, if the first rotation information is a rotational position on the steering wheel side, and the second rotation information is a rotational position on the torque generation unit side, the differential rotational speed calculation unit 22 calculates a difference between the first rotation information and the second rotation information, and sets a derivative of the difference as the differential rotational speed. Moreover, the differential rotational speed calculation unit 22 may set a difference between a derivative of the first rotation information and a derivative of the second rotation information as the differential rotational speed.

Moreover, for example, if the first rotation information is a rotational speed on the steering wheel side, and the second rotation information is a rotational speed on the torque generation unit side, the differential rotational speed calculation unit 22 may calculate a difference between the first rotation information and the second rotation information, and may set the difference as the differential rotational speed.

The torque generation unit 30 outputs the generated torque based on the assist torque command and the differential rotational speed from the control unit 20, to thereby assist the steering by the driver via the gears 13. The torque generation unit 30 includes a torque control unit 31 and an actuator 32.

The torque control unit 31 calculates a generated torque command based on a compensation torque set depending on the assist torque command from the assist torque command calculation unit 21 and the differential rotational speed from the differential rotational speed calculation unit 22, and outputs the generated torque command to the actuator 32. The actuator 32 outputs the generated torque based on the generated torque command from the torque control unit 31.

Figure 2:
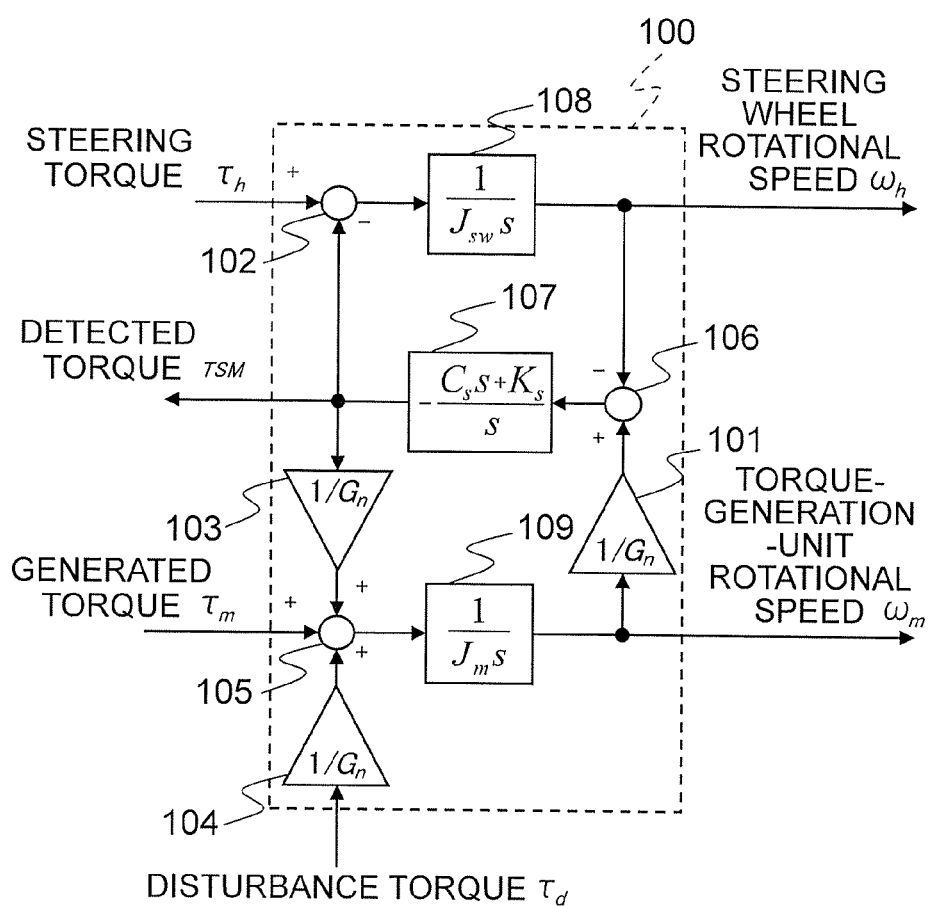
FIG. 2 is a block diagram for schematically illustrating a control subject of a torque generation unit in a general electric power steering control device.

Referring to FIG. 2 to FIG. 7, a description is now given of a method of setting the compensation torque based on the differential rotational speed from the differential rotational speed calculation unit 22 in the torque control unit 31. FIG. 2 is a block diagram for schematically illustrating the steering mechanism 10, which is a control subject 100 of the torque generation unit 30, in a general electric power steering control device without the torque control unit 31.

In FIG. 2, inputs to the control subject 100 are a steering torque $\tau_h$, a generated torque $\tau_m$, and a disturbance torque $\tau_d$. The steering torque $\tau_h$ represents a torque provided by the driver to the steering wheel 11 during the steering. The generated torque $\tau_m$ represents a torque generated by the torque generation unit 30. The disturbance torque $\tau_d$ represents a torque generated by an influence of a road surface reaction force and the like.

Moreover, outputs of the control subject 100 are a steering wheel rotational speed $\omega_h$, a torque-generation-unit rotational speed $\omega_m$, and a detected torque TSM. The steering wheel rotational speed $\omega_h$ is acquired from the first rotation information detected by the first rotation information detection unit 2. The torque-generation-unit rotational speed $\omega_m$ is acquired by dividing the rotational speed $\omega_{hm}$ acquired from the second rotation information detected by the second rotation information detection unit 3 by a gain 101 while a gear ratio $G_n$ of the gears 13 is considered (multiplying by the gear ratio $G_n$). The detected torque TSM represents a torque detected by the torque detection unit 1.

On this occasion, a reaction force generated by the torsional torque is applied to the steering wheel side steered by the driver, and hence a result of subtracting the detected torque TSM from the steering torque $\tau_h$ in an adder 102 is a torque applied to the first shaft 12 on the steering wheel side.

Moreover, a sum acquired in an adder 105 by adding the generated torque $\tau_m$ generated by the torque generation unit 30, the detected torque TSM converted with respect to the axis based on a gain 103 reflecting the gear ratio $G_n$, and the disturbance torque $\tau_d$ converted with respect to the axis based on a gain 104 reflecting the gear ratio $G_n$ to one another is a torque applied to the torque generation unit 30.

Moreover, the detected torque TSM is the detected torsional torque generated between the steering wheel side and the torque generation unit side, and is thus acquired in an adder 106 by multiplying the differential rotational speed acquired by subtracting the steering rotational speed $\omega_h$ from the rotational speed $\omega_{hm}$ on the torque generation unit side by a transfer function 107.

The transfer function 107 is a transfer function from the differential rotational speed to the torque on the axis of the steering wheel 11 when only viscosity and elasticity terms of the torque detection unit 1 are considered. In the transfer function 107, $C_s$ denotes a viscosity coefficient of the torque detection unit 1, and $K_s$ denotes a spring constant of the torque detection unit 1.

Moreover, a transfer function 108 is a transfer function from the torque to the rotational speed in the steering wheel 11 when losses such as a static friction and a dynamic friction are ignored and only an inertia is considered. In the transfer function 108, $J_{sw}$ denotes a moment of inertia of the steering wheel 11.

Moreover, a transfer function 109 is a transfer function from the torque to the rotational speed in the torque generation unit 30 when the losses such as a static friction and a dynamic friction are ignored and only an inertia is considered. In the transfer function 109, $J_m$ denotes a moment of inertia of the torque generation unit 30.

On this occasion, the torque detection unit 1 has a main function of detecting the torque from a torsional angle, and the viscosity coefficient $C_s$ is minute compared with the spring constant $K_s$. Then, even if such a consideration of approximating the viscosity coefficient $C_s$ by 0 is made, this approximation is a setting that is strict in terms of control stability, and poses no problem. Thus, in all embodiments, a description is given on the assumption that the viscosity coefficient $C_s$ is approximated by 0. It should be understood that even if a filter function is designed in consideration of the viscosity coefficient $C_s$, the same effect is provided.

Note that, from relational equations before and after the transfer function 108, Equation (1) is established.

[Math. 1]

$$\omega_h = \frac{1}{J_{sw}s}(\tau_h - TSM) \quad (1)$$

Moreover, from relational equations before and after the transfer function 107, Equation (2) is established.

[Math. 2]

$$TSM = \frac{K_s}{s}(\omega_h - \omega_{hm}) = \frac{K_s}{s}\left(\omega_h - \frac{\omega_m}{G_n}\right) \quad (2)$$

Moreover, from relational equations before and after the transfer function 109, Equation (3) is established.

[Math. 3]

$$\omega_m = \frac{1}{J_m s}\left(\tau_m + \frac{1}{G_n}TSM + \frac{1}{G_n}\tau_d\right) \quad (3)$$

On this occasion, Equation (4) is acquired by solving Equation (1) to Equation (3) with respect to the detected torque TSM.

[Math. 4]

$$TSM = -\frac{G_n J_{sw} K_s}{G_n^2 J_m J_{sw} s^2 + (J_{sw} + G_n^2 J_m) K_s}\tau_m + \frac{G_n^2 J_m K_s}{G_n^2 J_m J_{sw} s^2 + (J_{sw} + G_n^2 J_m) K_s}\tau_h - \frac{J_{sw} K_s}{G_n^2 J_m J_{sw} s^2 + (J_{sw} + G_n^2 J_m) K_s}\tau_d \quad (4)$$

On this occasion, it is appreciated that a natural frequency $\omega_a$ is represented as Equation (5).

[Math. 5]

$$\omega_a = \sqrt{K_s\left(\frac{1}{G_n^2 J_m} + \frac{1}{J_{sw}}\right)} \quad (5)$$

Figure 3:
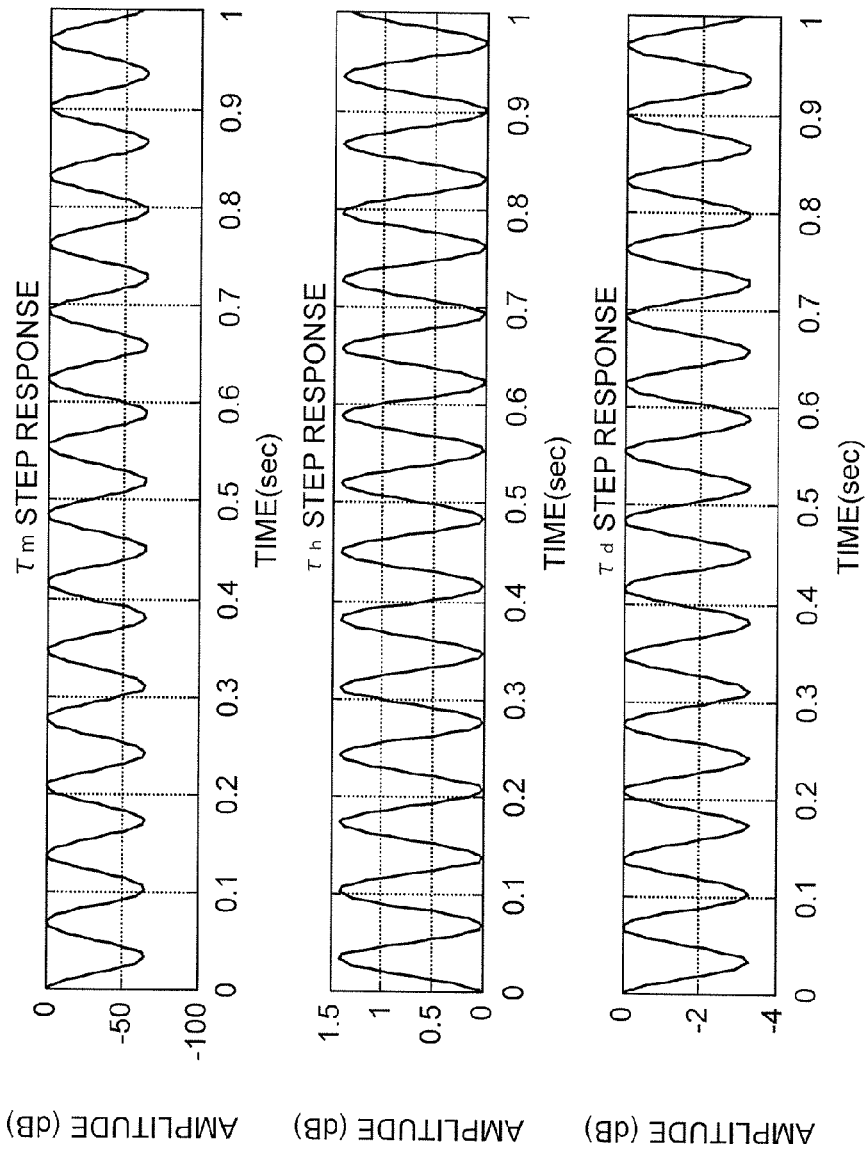
FIG. 3 is a graph for showing temporal changes in a detected torque when a step input is fed to each of a generated torque, a steering torque, and a disturbance torque in the general electric power steering control device.

FIG. 3 is a graph for showing temporal changes in the detected torque TSM when a step input is fed to each of the generated torque $\tau_m$, the steering torque $\tau_h$, and the disturbance torque $\tau_d$ in the general electric power steering control device. It is appreciated from FIG. 3 that the detected torque TSM vibrates at the natural frequency in any of the cases.

Figure 4:
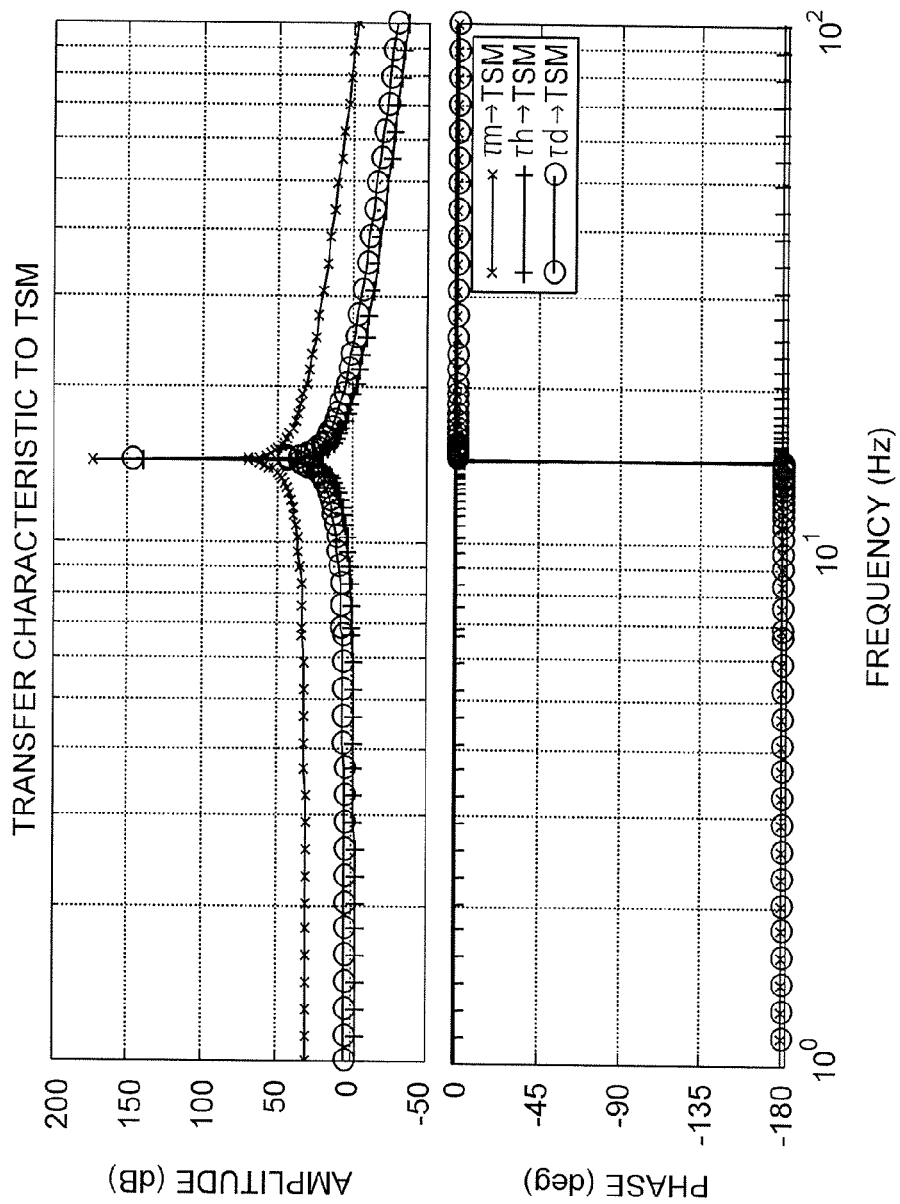
FIG. 4 is a Bode diagram for showing a transfer characteristic from the generated torque to a detected torque, a transfer characteristic from the steering torque to the detected torque, and a transfer characteristic from the disturbance torque to the detected torque in the general electric power steering control device.

FIG. 4 is a Bode diagram for showing a transfer characteristic from the generated torque $\tau_m$ to the detected torque TSM, a transfer characteristic from the steering torque $\tau_h$ to the detected torque TSM, and a transfer characteristic from the disturbance torque $\tau_d$ to the detected torque TSM in the general electric power steering control device. From FIG. 4, it is appreciated that the gain is very large at the natural frequency, and the oscillation phenomena shown in FIG. 3 are generated.

Figure 5:
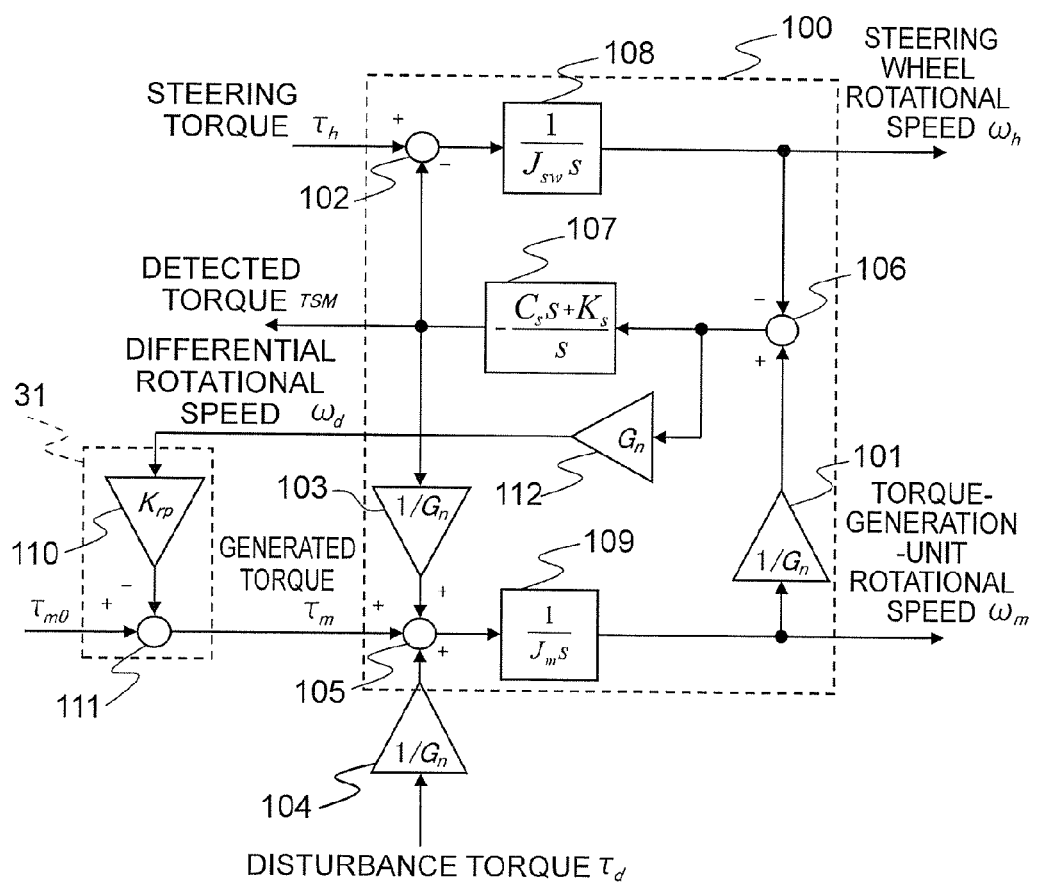
FIG. 5 is a block diagram for schematically illustrating the control subject of the torque generation unit along with a torque control unit in the electric power steering control device according to the first embodiment of the present invention.

Thus, as illustrated in FIG. 5, such a configuration is considered that the torque control unit 31 is constructed by a gain 110 and an adder 111 and the generated torque $\tau_m$ reflecting the compensation torque set depending on a differential rotational speed $\omega_d$ acquired through a gain 112 is provided. FIG. 5 is a block diagram for schematically illustrating the control subject 100 of the torque generation unit 30 along with the torque control unit 31 in the electric power steering control device according to the first embodiment of the present invention.

Note that, in FIG. 1, although the generated torque is the output of the actuator 32 and the generated torque command is the output of the torque control unit 31, the generated torque is uniquely determined by the generated torque command. Thus, in FIG. 5, the generated torque and the generated torque command are considered to be equivalent to each other, and a description of the generated torque command is omitted.

In FIG. 5, the differential rotational speed $\omega_d$ on the axis of the torque generation unit 30 is acquired by multiplying the differential rotational speed $(\omega_n - \omega_{hm})$ on the axis of the steering wheel 11 by the gain 112. In the adder 111, the compensation torque acquired by multiplying the differential rotational speed $\omega_d$ by the gain 110 is subtracted from an assist torque command $\tau_{m0}$.

On this occasion, the differential rotational speed $\omega_d$ is represented as Equation (6).

[Math. 6]

$$\omega_d = \omega_m - G_n \omega_h \quad (6)$$

Moreover, as a relationship equation in the adder 111, Equation (7) is established.

[Math. 7]

$$\tau_m = \tau_{m0} - K_{rp}\omega_d \quad (7)$$
$$= \tau_{m0} - K_{rp}(\omega_m - G_n\omega_h)$$

Moreover, Equation (8) is acquired by solving Equation (1) to Equation (3) and Equation (7) with respect to the detected torque TSM.

[Math. 8]

$$TSM = -\frac{G_n J_{sw} K_s}{G_n^2 J_m J_{sw} s^2 + G_n^2 J_{sw} K_{rp} s + (J_{sw} + G_n^2 J_m) K_s}\tau_{m0} + \frac{G_n^2 J_m K_s}{G_n^2 J_m J_{sw} s^2 + G_n^2 J_{sw} K_{rp} s + (J_{sw} + G_n^2 J_m) K_s}\tau_h - \frac{J_{sw} K_s}{G_n^2 J_m J_{sw} s^2 + G_n^2 J_{sw} K_{rp} s + (J_{sw} + G_n^2 J_m) K_s}\tau_d \quad (8)$$

On this occasion, a gain $K_{rp}$ is given as Equation (9).

[Math. 9]

$$K_{rp} = 2J_m \omega_a \zeta \quad (9)$$

On this occasion, the detected torque TSM is represented as Equation (10) from Equation (5), Equation (8), and Equation (9). In other words, the detected torque TSM is represented by a transfer function of a second order lag having a variable damping factor by a braking ratio $\zeta$.

[Math. 10]

$$TSM = \qquad (10)$$
$$-\frac{\frac{K_s}{G_n J_m}}{s^2 + 2\zeta\omega_a s + \omega_a^2}\tau_{m0} + \frac{\frac{K_s}{J_{sw}}}{s^2 + 2\zeta\omega_a s + \omega_a^2}\tau_h - \frac{\frac{K_s}{G_n^2 J_m}}{s^2 + 2\zeta\omega_a s + \omega_a^2}\tau_d$$

Figure 6:
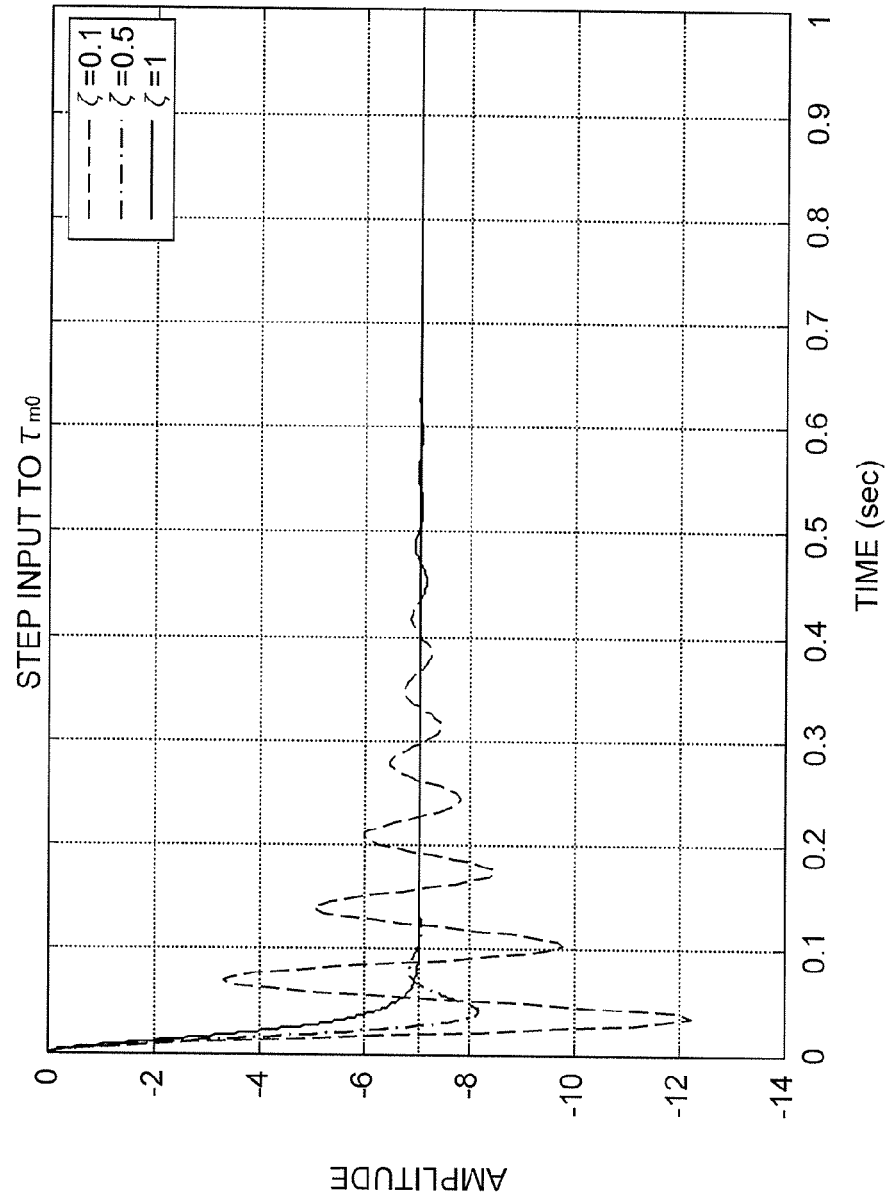
FIG. 6 is a graph for showing a temporal change in the detected torque when the step input is fed to an assist torque command in the electric power steering control device according to the first embodiment of the present invention.

FIG. 6 is a graph for showing a temporal change in the detected torque TSM when the step input is fed to the assist torque command $\tau_{m0}$ in the electric power steering control device according to the first embodiment of the present invention. FIG. 3 corresponds to a case in which the braking ratio $\zeta$ is 0, and, from FIG. 6, it is appreciated that the vibration can be suppressed by increasing the braking ratio $\zeta$.

Figure 7:
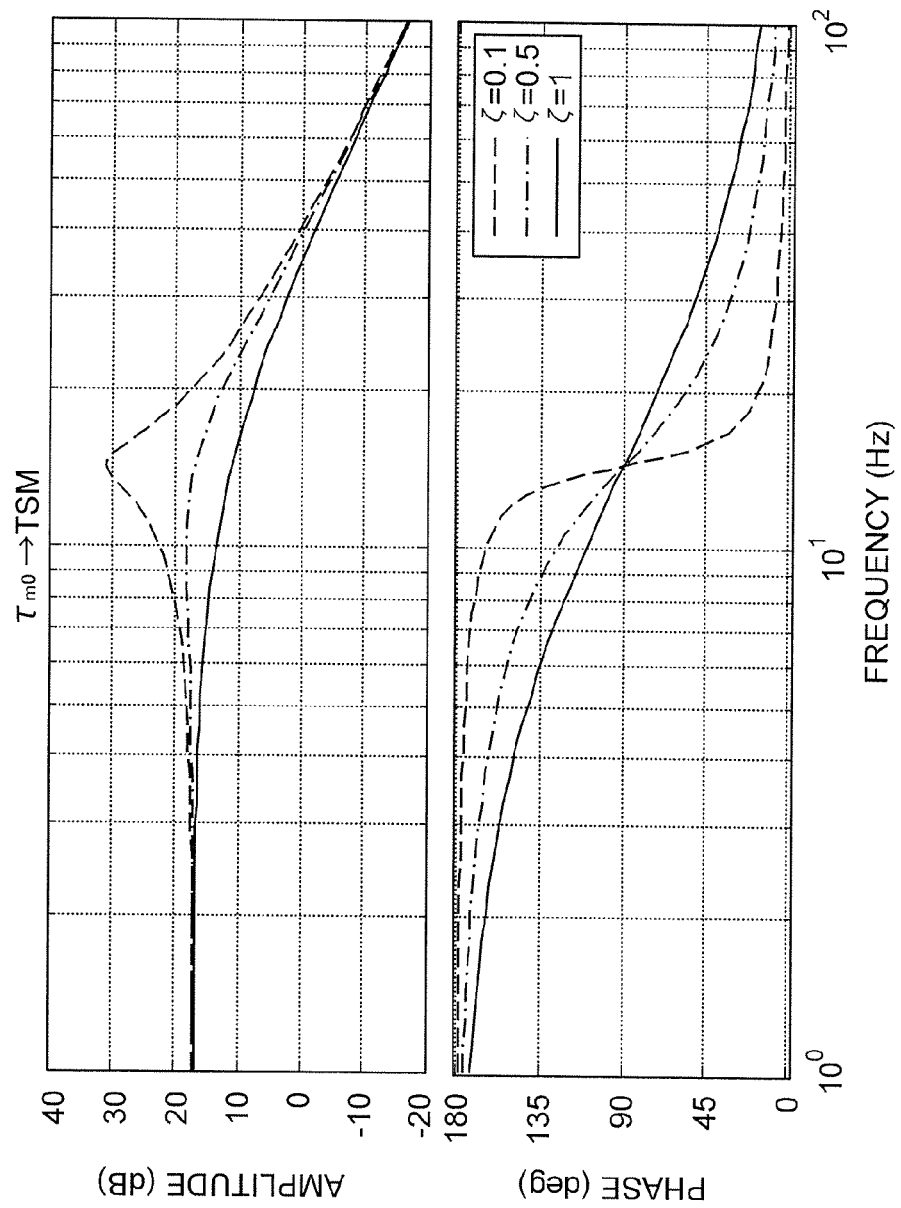
FIG. 7 is a Bode diagram for showing a transfer characteristic from the assist torque command to the detected torque and the transfer characteristic from the disturbance torque to the detected torque in the electric power steering control device according to the first embodiment of the present invention.

FIG. 7 is a Bode diagram for showing a transfer characteristic from the assist torque command $\tau_{m0}$ to the detected torque TSM in the electric power steering control device according to the first embodiment of the present invention. In FIG. 7, if the braking ratio $\zeta$ is 0.1, a peak exists at the natural frequency, and the case in which the braking ratio $\zeta$ is further decreased to 0 is shown in FIG. 4. On the other hand, if the braking ratio $\zeta$ is increased, for example, to 1, the gain peak existing in the natural frequency disappears, and it is appreciated that the vibration can be suppressed also from the Bode diagram.

A description is now given of an example of settings of the differential rotational speed calculation unit 22 and the torque control unit 31 illustrated in FIG. 1. In the differential rotational speed calculation unit 22, the differential rotational speed $\omega_d$ between the steering wheel side and the torque generation unit side is calculated in accordance with Equation (6) based on the first rotation information detected by the first rotation information detection unit 2 and the second rotation information detected by the second rotation information detection unit 3.

Moreover, in the torque control unit 31, the command directed to the actuator 32 is calculated by subtracting the compensation torque acquired by multiplying the differential rotational speed $\omega_d$ calculated by the differential rotational speed calculation unit 22 by the gain $K_{rp}$ from the assist torque command $\tau_{m0}$ acquired by the assist torque command calculation unit 21 as represented in Equation (7).

Figure 8:
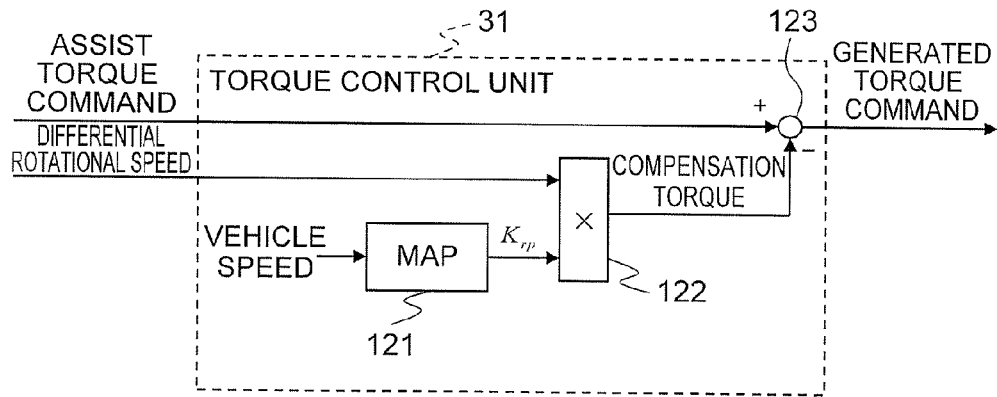
FIG. 8 is a block diagram for illustrating a configuration of the torque control unit of the electric power steering control device according to the first embodiment of the present invention.

Note that, in the above description, the gain $K_{rp}$ for the differential rotational speed $\omega_d$ is given as Equation (9), but the configuration is not limited to this case. The torque control unit 31 may be such a block as illustrated in FIG. 8. FIG. 8 is a block diagram for illustrating a configuration of the torque control unit 31 of the electric power steering control device according to the first embodiment of the present invention.

In FIG. 8, the torque control unit 31 includes a map 121 for storing a relationship between the vehicle speed and the gain $K_{rp}$, a multiplier 122, and an adder 123. On this occasion, the gain $K_{rp}$ is calculated from the map 121 based on the vehicle speed signal. The vehicle speed signal is acquired via a publicly known in-vehicle network such as a controller area network (CAN) or FlexRay.

Then, in the multiplier 122, the compensation torque is calculated by multiplying the differential rotational speed by the gain $K_{rp}$. Then, in the adder 123, the generated torque command is calculated by subtracting the compensation torque from the assist torque command. Note that, in the torque control unit 31 of FIG. 8, the gain $K_{rp}$ is switched based on the vehicle speed signal, but the configuration is not limited to this case. The gain $K_{rp}$ may be switched based on vehicle information such as a steering wheel steering angle, an acceleration, or a yaw rate.

The related-art electric power steering control device described in Patent Literature 1 only suppresses the vibration component included in the rotation speed on the torque generation unit side, and cannot suppress the differential rotational speed between the steering wheel side and the torque generation unit side, and hence there is such a problem that the driver feels uncomfortable torque vibration during the turning-back of the steering wheel and the like.

In contrast, according to the electric power steering control device of the first embodiment, such an effect can be provided that by setting the braking ratio $\zeta$ to an appropriate value, the differential rotational speed between the steering wheel side and the torque generation unit side can be suppressed, with the result that the torque vibration generated by the differential rotational speed between the steering wheel side and the torque generation unit side can be suppressed, which is not provided by the related art.

Moreover, through the use of the first rotation information detection unit 2 and the second rotation information detection unit 3, it is possible to precisely detect the differential rotational speed.

Note that, in the first embodiment, as the differential rotational speed, the differential rotational speed on the axis of the torque generation unit 30 is used, but the configuration is not limited to this case. A differential rotational speed on the axis of the steering wheel 11 may be used to include a component corresponding to the conversion of the gain 110 by the gear ratio, to thereby acquire the same effect.

Moreover, in the first embodiment, the assist torque command is calculated in the assist torque command calculation unit 21 based only on the detected torque from the torque detection unit 1, but the configuration is not limited to this case. The same effect can also be provided by, in order to secure control stability, using a detected torque through a compensator constructed with signals such as the rotational speed, to thereby calculate the assist torque command.

Moreover, the second rotation information detection unit 3 is provided on the axis of the first shaft 12 in the first embodiment, but the configuration is not limited to this case. The same effect can be provided by providing the second rotation information detection unit 3 on the axis of the torque generation unit 30.

Moreover, in the first embodiment, the detected torque TSM and the torque-generation-unit rotational speed $\omega_m$ have the negative correlation, but the configuration is not limited to this case. The same effect can be provided in the electric power steering control device using the torque detection unit 1 having a positive correlation between the detected torque TSM and the torque-generation-unit rotational speed $\omega_m$.

Second Embodiment

In the first embodiment, the electric power steering control device includes the first rotation information detection unit 2 and the second rotation information detection unit 3, but the two rotation information detection units are not always installed due to the cost, the space, and the like.

Figure 9:
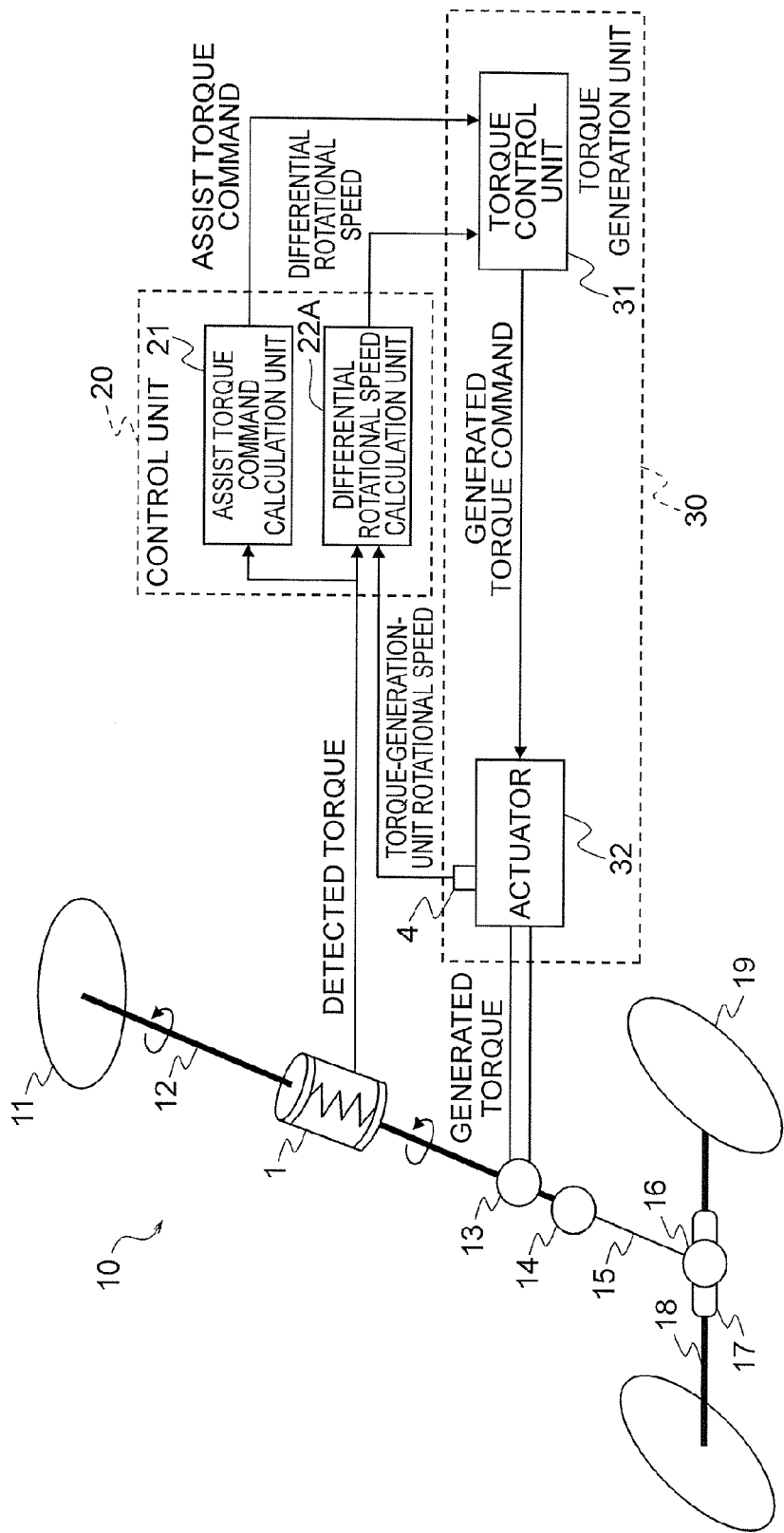
FIG. 9 is a schematic diagram for illustrating an overall configuration of an electric power steering control device according to a second embodiment of the present invention.

FIG. 9 is a schematic diagram for illustrating an overall configuration of an electric power steering control device according to a second embodiment of the present invention. In FIG. 9, as the electric power steering control device, a power steering control device of the column type is schematically illustrated. Note that, in the following, the description of the same components as those of the first embodiment is omitted.

In FIG. 9, this electric power steering control device includes the steering mechanism 10, the torque detection unit 1 (such as a torque sensor), a rotational speed detection unit 4, the control unit 20, and the torque generation unit 30.

In the steering mechanism 10, when a driver steers the steering wheel 11 clockwise or counterclockwise, the first shaft 12 rotates by an amount of the rotation of the steering wheel 11. At this time, the torque of the rotation of the first shaft 12 is assisted by the torque generation unit 30 via the gears 13. The rotation of the first shaft 12 is transmitted to the second shaft 15 via the joint 14.

The rotational motion of the second shaft 15 is converted into a linear motion by the pinion 16, and is transmitted to the rack 17. At this time, when the rack 17 moves in an axial direction, the tie rods 18 also move in the axial direction. As a result, the tires 19 are turned back.

The torque detection unit 1 is arranged between the steering wheel 11 and the torque generation unit 30 (gears 13). While the driver is operating the steering wheel 11, a torsion is generated between the steering wheel side and the torque generation unit side across the torque detection unit 1, and a difference in rotational position is generated. The torque detection unit 1 detects this torsion, and outputs the torsion to the control unit 20 as a detected torque.

The rotational speed detection unit 4 detects the rotational speed of the actuator 32 (described later) of the torque generation unit 30 when the driver rotates the steering wheel 11, and outputs the rotational speed to the control unit 20 as a torque-generation-unit rotational speed.

The control unit 20 calculates the assist torque command and the differential rotational speed based on the detected torque and the torque-generation-unit rotational speed output respectively from the torque detection unit 1 and the rotational speed detection unit 4, and outputs the assist torque command and the differential rotational speed to the torque generation unit 30. The control unit 20 includes the assist torque command calculation unit 21 and a differential rotational speed calculation unit 22A.

The assist torque command calculation unit 21 calculates the assist torque command based on the detected torque from the torque detection unit 1. The differential rotational speed calculation unit 22A calculates the differential rotational speed between the steering wheel side and the torque generation unit side of the torque detection unit 1 based on the detected torque from the torque detection unit 1 and the torque-generation-unit rotational speed from the rotational speed detection unit 4.

The torque generation unit 30 outputs the generated torque based on the assist torque command and the differential rotational speed from the control unit 20, to thereby assist the steering by the driver via the gears 13. The torque generation unit 30 includes the torque control unit 31 and the actuator 32.

The torque control unit 31 calculates a generated torque command based on a compensation torque set depending on the assist torque command from the assist torque command calculation unit 21 and the differential rotational speed from the differential rotational speed calculation unit 22A, and outputs the generated torque command to the actuator 32. The actuator 32 outputs the generated torque based on the generated torque command from the torque control unit 31.

At this time, in the second embodiment of the present invention, the steering wheel rotational speed $\omega_h$ cannot be detected, and hence the differential rotational speed cannot be calculated based on Equation (6) described in the first embodiment.

Thus, according to the second embodiment, a description is given of a method of calculating, by the differential rotational speed calculation unit 22A, the differential rotational speed $\omega_d$ between the steering wheel side and the torque generation unit side of the torque detection unit 1 based on the detected torque from the torque detection unit 1 and the torque-generation-unit rotational speed from the rotational speed detection unit 4.

First, Equation (11) is acquired from Equation (2) and Equation (6).

[Math. 11]

$$\omega_d = \omega_m - G_n \omega_h = -\frac{G_n}{K_s} sTSM \quad (11)$$

Moreover, as a result of expansion by using Equation (11), the differential rotational speed $\omega_d$ is represented as Equation (12) by using a filtering function f(s), the torque-generation-unit rotational speed $\omega_m$, and the detected torque TSM.

[Math. 12]

$$\omega_d = f(s)\omega_d + \{1 - f(s)\}\omega_d \quad (12)$$
$$= f(s)(\omega_m - G_n\omega_h) - s\{1 - f(s)\}\frac{G_n}{K_s} sTSM$$

Meanwhile, it is assumed that if the moment of inertia of the torque generation unit 30 is minute compared with the moment of inertia of the steering wheel 11, the vibration of the steering wheel rotational speed $\omega_h$ is minute compared with the vibration of the torque-generation-unit rotational speed $\omega_m$, and is approximated as represented by Equation (13).

[Math. 13]

$$f(s)G_n\omega_h \approx 0 \quad (13)$$

Then, the differential rotational speed $\omega_d$ is represented as Equation (14) from Equation (12) and Equation (13).

[Math. 14]

$$\omega_d \approx f(s)\omega_m - s\{1 - f(s)\}\frac{G_n}{K_s} TSM \quad (14)$$

A description is now given of an example of settings of the differential rotational speed calculation unit 22A and the torque control unit 31 illustrated in FIG. 9. In the differential rotational speed calculation unit 22A, the differential rotational speed $\omega_d$ between the steering wheel side and the torque generation unit side is calculated in accordance with Equation (14) based on the detected torque detected by the torque detection unit 1 and the torque-generation-unit rotational speed detected by the rotational speed detection unit 4.

Figure 10:
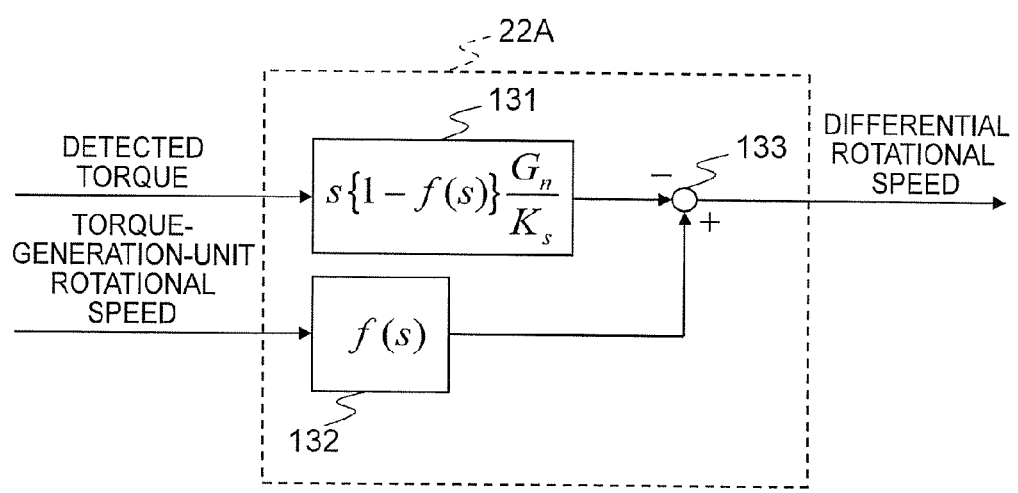
FIG. 10 is a block diagram for illustrating a configuration of a differential rotational speed calculation unit of the electric power steering control device according to the second embodiment of the present invention.

FIG. 10 is a block diagram for illustrating the configuration of the differential rotational speed calculation unit 22A of the electric power steering control device according to the second embodiment of the present invention. In FIG. 10, a second term of Equation (14) is acquired by multiplying the detected torque by a transfer function 131. Moreover, a first term of Equation (14) is acquired by multiplying the torque-generation-unit rotational speed by a transfer function 132. Moreover, an adder 133 subtracts the acquired second term from the acquired first term of Equation (14), to thereby acquire the differential rotational speed $\omega_d$.

Moreover, in the torque control unit 31, the generated torque command directed to the actuator 32 is calculated by subtracting the compensation torque acquired by multiplying the differential rotational speed $\omega_d$ calculated by the differential rotational speed calculation unit 22A by the gain $K_{rp}$ from the assist torque command $\tau_{m0}$ acquired by the assist torque command calculation unit 21 as represented in Equation (7). In this case, as in the first embodiment, the gain $K_{rp}$ may be switched depending on the parameters such as the vehicle speed signal.

Moreover, if the filter function f(s) is constructed, for example, only by the gain $K_f$, the differential rotational speed $\omega_d$ is represented as Equation (15). In other words, the differential rotational speed $\omega_d$ is represented by the torque-generation-unit rotational speed $\omega_m$ and a derivative of the detected torque TSM.

[Math. 15]

$$\omega_d \approx K_f \omega_m - \frac{(1-K_f)G_n}{K_s} sTSM \qquad (15)$$

The related-art electric power steering control device disclosed in Patent Literature 1 only suppresses the vibration component included in the rotational speed on the torque generation unit side, and cannot suppress the differential rotational speed between the steering wheel side and the torque generation unit side, and hence there is such a problem that the driver feels uncomfortable torque vibration during the turning-back of the steering wheel and the like.

In contrast, according to the electric power steering control device of the second embodiment of the present invention, such an effect can be provided that the torque vibration generated by the differential rotational speed can be suppressed by setting the braking ratio ζ to an appropriate value without detecting the rotation information on the steering wheel side, which is not provided by the related art.

Moreover, according to the electric power steering control device of the second embodiment of the present invention, such an effect can be provided that the differential rotational speed between the steering wheel side and the torque generation unit side can be calculated based on the detected torque detected by the torque detection unit and the torque-generation-unit rotational speed detected by the rotational speed detection unit, which is not provided by the related art.

Note that, in the second embodiment, as the differential rotational speed, the differential rotational speed on the axis of the torque generation unit 30 is used, but the configuration is not limited to this case. A differential rotational speed on the axis of the steering wheel 11 may be used to acquire the same effect by including a component corresponding to the conversion of the gear ratio in the gain 110.

Moreover, in the second embodiment, the assist torque command is calculated in the assist torque command calculation unit 21 based only on the detected torque from the torque detection unit 1, but the configuration is not limited to this case. The same effect can be provided by, in order to secure control stability, using the detected torque through a compensator constructed with signals such as the rotational speed to calculate the assist torque command.

Moreover, in the second embodiment, the detected torque TSM and the torque-generation-unit rotational speed $\omega_m$ have the negative correlation, but the configuration is not limited to this case. The same effect can be provided in the electric power steering control device using the torque detection unit 1 having a positive correlation between the detected torque TSM and the torque-generation-unit rotational speed $\omega_m$.

Third Embodiment

In the second embodiment, the filter function f(s) is defined as being constructed by the gain $K_f$. However, as represented in Equation (15), the derivative of the detected torque TSM is used, and hence amplified noises in a high frequency band of the detected torque TSM may be included into the differential rotational speed $\omega_d$ depending on specifications of the torque detection unit 1.

Thus, an electric power steering control device according to a third embodiment of the present invention includes a differential rotational speed calculation unit (not shown) for calculating the differential rotational speed based on a signal acquired by high-pass filtering the detected torque and a signal acquired by high-pass filtering the torque-generation-unit rotational speed.

Specifically, in the third embodiment of the present invention, the filter function f(s) is a first-order high pass filter represented as Equation (16).

[Math. 16]

$$f(s) = \frac{s}{s+\omega_1} \qquad (16)$$

In this case, the differential rotational speed $\omega_d$ is represented as Equation (17) from Equation (12) and Equation (16).

[Math. 17]

$$\omega_d = \frac{s}{s+\omega_1}(\omega_m - G_n\omega_h) - \frac{s}{s+\omega_1}\frac{\omega_1 G_n}{K_s}TSM \qquad (17)$$

Moreover, in an area of frequencies higher than a cutoff frequency of the high pass filter, when it is assumed that the vibration of the steering wheel rotational speed $\omega_h$ is minute, the differential rotational speed $\omega_d$ is represented as Equation (18).

[Math. 18]

$$\omega_d \approx \frac{s}{s+\omega_1}\omega_m - \frac{s}{s+\omega_1}\frac{\omega_1 G_n}{K_s}TSM \qquad (18)$$

As a result, the differential rotational speed $\omega_d$ can be calculated based on the signal acquired by high-pass filtering the torque-generation-unit rotational speed $\omega_m$ and the signal acquired by high-pass filtering the detected torque TSM.

In this case, the differential rotational speed $\omega_d$ in the second embodiment is represented by the derivative component of the detected torque ISM as in Equation (15), but the differential rotational speed $\omega_d$ in the third embodiment of the present invention can be represented by the signal acquired by high-pass filtering the detected torque TSM as in Equation (18).

As described above, according to the electric power steering control device of the third embodiment of the present invention, the gain for the detected torque TSM is $\omega_1 G_n/K_s$ in the high frequency band, and such an effect can be provided that the influence of the noises of the detected torque TSM in the high frequency band can be reduced, which is not provided by the related art.

Moreover, by setting the cutoff frequency of the high pass filter to be higher than a possible steering frequency, the steering wheel rotational speed $\omega_h$ is considered to include only components in a band of frequencies equal to or lower than the possible steering frequency, and hence an approximation error caused when the term of the steering rotational speed $\omega_h$ is considered to be 0 can be suppressed.

Further, setting the cutoff frequency of the high pass filtering in the differential rotational speed calculation unit to be higher than the possible frequency of the steering of the steering wheel 11 by the driver provides such an effect that precision of the differential rotational speed acquired by the calculation when the driver steers the steering wheel 11 can be improved, which is not provided by the related art.

Fourth Embodiment

In the third embodiment, the filter function f(s) is defined as the first-order high pass filter, and the term of the steering wheel rotational speed $\omega_h$ is considered to be 0. Moreover, the steering wheel rotational speed $\omega_h$ is represented as Equation (1) by using the steering wheel torque $\tau_h$. Moreover, Equation (19) is acquired by assigning Equation (1) to Equation (12).

[Math. 19]

$$\omega_d = f(s)\omega_m - s\{1 - f(s)\}\frac{G_n}{K_s}TSM - \frac{f(s)G_n}{J_{sw}s}(\tau_h - TSM) \quad (19)$$

In this case, if the filter function f(s) is defined as a first-order high pass filter as represented by Equation (16), a third term of Equation (19) is a value acquired by multiplying a result of low-pass filtering a difference ($\tau_h$–TSM) between the steering torque $\tau_h$ and the detected torque TSM by the gain. Therefore, components of frequencies equal to or lower than the cutoff frequency of the filter remain, and the calculation precision of the differential rotational speed $\omega_d$ may decrease.

Thus, an electric power steering control device according to a fourth embodiment of the present invention includes a differential rotational speed calculation unit (not shown) for applying high pass filtering of the second or higher order.

Specifically, in the fourth embodiment of the present invention, the filter function f(s) is a second-order high pass filter represented as Equation (20).

[Math. 20]

$$f(s) = \frac{s}{s + \omega_1}\frac{s}{s + \omega_2} \quad (20)$$

In this case, the differential rotational speed $\omega_d$ is represented as Equation (21) from Equation (19) and Equation (20).

[Math. 21]

$$\omega_d = \frac{s}{s + \omega_1}\frac{s}{s + \omega_2}\omega_m - \qquad (21)$$
$$\frac{\omega_1 s}{s + \omega_1}\left(1 + \frac{\omega_2}{\omega_1}\frac{s}{s + \omega_2}\right)\frac{G_n}{K_s}TSM - \frac{1}{s + \omega_1}\frac{s}{s + \omega_2}\frac{G_n}{J_{sw}}(\tau_h - TSM)$$

In Equation (21), the difference between the steering torque $\tau_h$ and the detected torque TSM is considered to be minute in components of a frequency band equal to or higher than the cutoff frequency of the filter, and the difference ($\tau_h$–TSM) between the steering torque $\tau_h$ and the detected torque TSM is thus considered to be 0. In other words, the differential rotational speed $\omega_d$ can be represented as Equation (22).

[Math. 22]

$$\omega_d = \frac{s}{s + \omega_1}\frac{s}{s + \omega_2}\omega_m - \frac{\omega_1 s}{s + \omega_1}\left(1 + \frac{\omega_2}{\omega_1}\frac{s}{s + \omega_2}\right)\frac{G_n}{K_s}TSM \quad (22)$$

As a result, based on a signal acquired by second-order high-pass filtering the torque-generation-unit rotational speed $\omega_m$ and a signal acquired by first-order and second-order high-pass filtering the detected torque TSM, the differential rotational speed $\omega_d$ can be calculated.

In this case, in the third embodiment, when the differential rotational speed $\omega_d$ is approximated, as in Equation (17) and Equation (18), a component acquired by low-pass filtering the difference between the steering torque $\tau_h$ and the detected torque TSM is set to be 0. In contrast, in the fourth embodiment of the present invention, the second-order high pass filter can be used to achieve precise approximation to 0 as represented in Equation (21) and Equation (22), and such an effect can be provided that the differential rotational speed $\omega_d$ is precisely calculated, which is not provided by the related art.

Moreover, by setting the cutoff frequency of the high pass filter to be higher than the possible steering frequency, the difference ($\tau_h$–TSM) between the steering torque $\tau_h$ and the detected torque TSM is considered to include only components in a band of frequencies equal to or lower than the possible steering frequency, and hence the approximation error caused when the term of the steering rotational speed $\omega_h$ is considered to be 0 can be suppressed.

Further, setting the cutoff frequency of the high pass filtering in the differential rotational speed calculation unit to be higher than the possible frequency of the steering of the steering wheel 11 by the driver provides such an effect that the precision of the differential rotational speed acquired by the calculation when the driver steers the steering wheel 11 can be improved, which is not provided by the related art.

Note that, in the fourth embodiment, the second-order high pass filter is used as the filter function of the differential rotational speed calculation unit, but the configuration is not limited to this case. The same effect can be provided by using a high pass filter of the second or higher order.

Fifth Embodiment

In the first embodiment, the electric power steering control device includes the first rotation information detection unit 2 and the second rotation information detection unit 3, but the number of rotation information detection units is not necessarily two due to the cost, the space, and the like.

Figure 11:
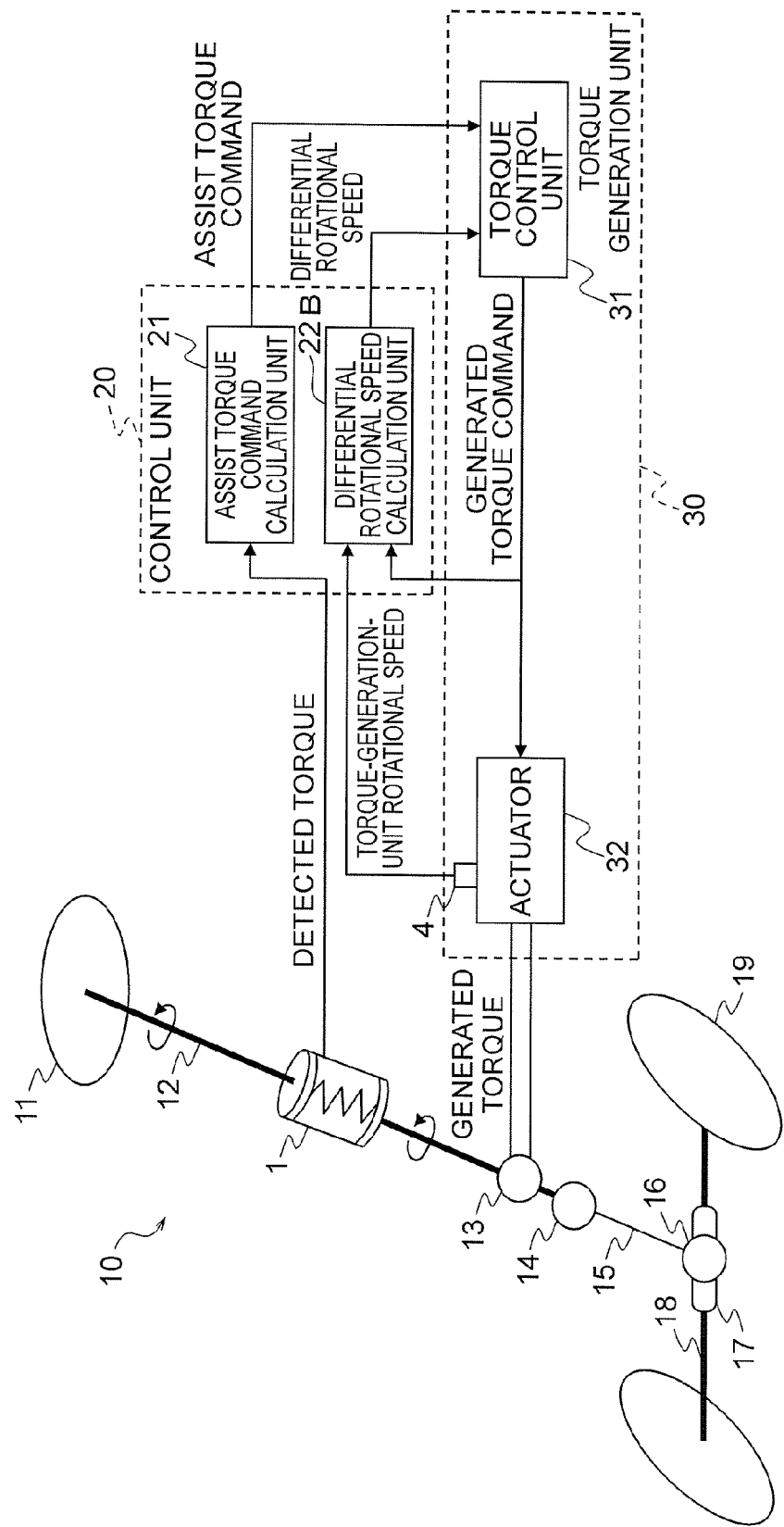
FIG. 11 is a schematic diagram for illustrating an overall configuration of an electric power steering control device according to a fifth embodiment of the present invention.

FIG. 11 is a schematic diagram for illustrating an overall configuration of an electric power steering control device according to a fifth embodiment of the present invention. In FIG. 11, as the electric power steering control device, a power steering control device of the column type is schematically illustrated. Note that, in the following, the description of the same components as those of the first embodiment is omitted.

In FIG. 11, this electric power steering control device includes the steering mechanism 10, the torque detection unit 1 (such as a torque sensor), the rotational speed detection unit 4, the control unit 20, and the torque generation unit 30.

In the steering mechanism 10, when a driver steers the steering wheel 11 clockwise or counterclockwise, the first shaft 12 rotates by an amount of the rotation of the steering wheel 11. At this time, the torque of the rotation of the first shaft 12 is assisted by the torque generation unit 30 via the gears 13. The rotation of the first shaft 12 is transmitted to the second shaft 15 via the joint 14.

The rotational motion of the second shaft 15 is converted into a linear motion by the pinion 16, and is transmitted to the rack 17. At this time, when the rack 17 moves in an axial direction, the tie rods 18 also move in the axial direction. As a result, the tires 19 are turned back.

The torque detection unit 1 is arranged between the steering wheel 11 and the torque generation unit 30 (gears 13). While the driver is operating the steering wheel 11, a torsion is generated between the steering wheel side and the torque generation unit side across the torque detection unit 1, and a difference in rotational position is generated. The torque detection unit 1 detects this torsion, and outputs the torsion to the control unit 20 as a detected torque.

The rotational speed detection unit 4 detects the rotational speed of the actuator 32 (described later) of the torque generation unit 30 when the driver rotates the steering wheel 11, and outputs the rotational speed to the control unit 20 as the torque-generation-unit rotational speed.

The control unit 20 calculates the assist torque command and the differential rotational speed based on the detected torque and the torque-generation-unit rotational speed output respectively from the torque detection unit 1 and the rotational speed detection unit 4, and on the generated torque command calculated by the torque control unit 31 (described later) of the torque generation unit 31, and outputs the assist torque command and the differential rotational speed to the torque generation unit 30. The control unit 20 includes the assist torque command calculation unit 21 and a differential rotational speed calculation unit 22B.

The assist torque command calculation unit 21 calculates the assist torque command based on the detected torque from the torque detection unit 1. The differential rotational speed calculation unit 22B calculates the differential rotational speed between the steering wheel side and the torque generation unit side of the torque detection unit 1 based on the torque-generation-unit rotational speed from the rotational speed detection unit 4 and the generated torque command from the torque control unit 31.

The torque generation unit 30 outputs the generated torque based on the assist torque command and the differential rotational speed from the control unit 20, to thereby assist the steering by the driver via the gears 13. The torque generation unit 30 includes the torque control unit 31 and the actuator 32.

The torque control unit 31 calculates a generated torque command based on a compensation torque set depending on the assist torque command from the assist torque command calculation unit 21 and the differential rotational speed from the differential rotational speed calculation unit 22B, and outputs the generated torque command to the actuator 32.

The actuator 32 outputs the generated torque based on the generated torque command from the torque control unit 31. In this case, the generated torque is uniquely determined by the generated torque command, and the calculation based on the generated torque command is exactly the same as the calculation based on the generated torque.

In this case, in the fifth embodiment of the present invention, the steering wheel rotational speed $\omega_h$ cannot be detected, and hence the differential rotational speed cannot be calculated based on Equation (6) described in the first embodiment.

Thus, in the fifth embodiment, a description is given of a method of calculating, by the differential rotational speed calculation unit 22B, the differential rotational speed $\omega_d$ between the steering wheel side and the torque generation unit side of the torque detection unit 1 based on the torque-generation-unit rotational speed from the rotational speed detection unit 4 and the generated torque command from the torque control unit 31.

Figure 12:
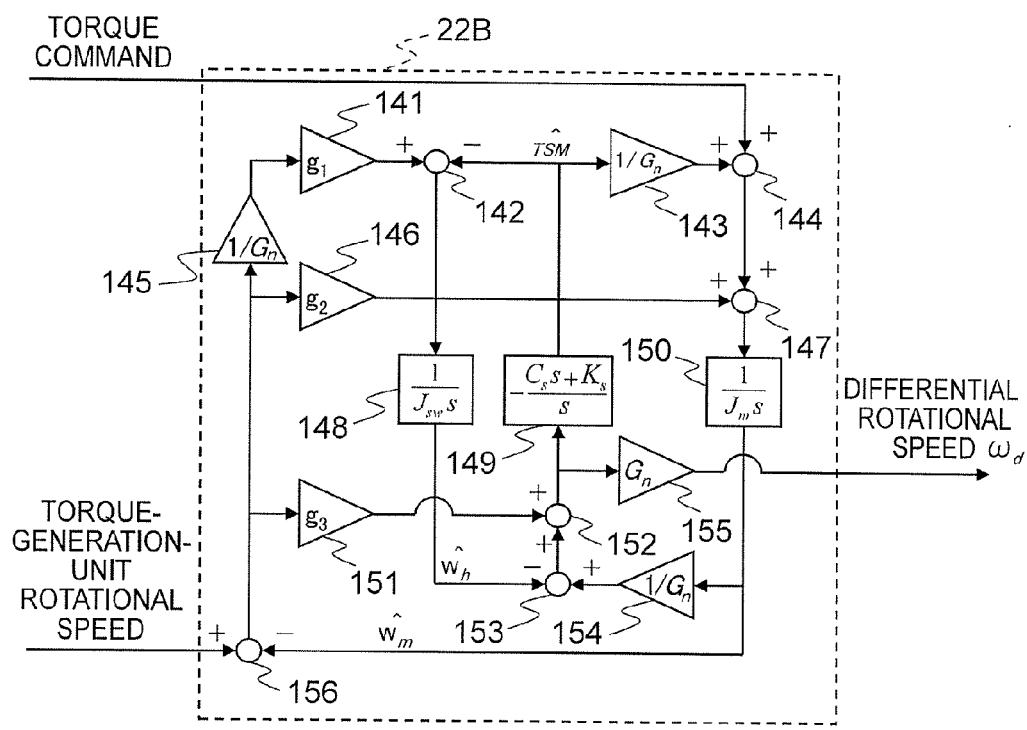
FIG. 12 is a block diagram for illustrating a configuration of a differential rotational speed calculation unit of the electric power steering control device according to the fifth embodiment of the present invention.

FIG. 12 is a block diagram for illustrating the configuration of the differential rotational speed calculation unit 22B of the electric power steering control device according to the fifth embodiment of the present invention. In FIG. 12, as an example of setting of the differential rotational speed calculation unit 22B, a control block using an observer is illustrated. Note that, in FIG. 12, for example, a character $\omega$ with "^" is herein described as $\omega$ (hat).

In FIG. 12, $\omega_h$ (hat) denotes a steering wheel rotational speed estimated value, $\omega_m$ (hat) denotes a torque-generation-unit rotational speed estimated value, and TSM (hat) denotes a detected torque estimated value. Moreover, $G_n$ denotes the gear ratio of the gears 13, $J_{sw}$ denotes the moment of inertia of the steering wheel 11, $J_m$ denotes the moment of inertia of the torque generation unit 30, $C_s$ denotes the viscosity coefficient of the torque detection unit 1, and $K_s$ denotes the spring constant of the torque detection unit 1.

Moreover, in FIG. 12, the differential rotational speed calculation unit 22B is constructed by a gain $(g_1)$ 141, an adder 142, a gain $(1/G_n)$ 143, an adder 144, a gain $(1/G_n)$ 145, a gain $(g_2)$ 146, an adder 147, a transfer function (same as the transfer function 108 of FIG. 1) 148, a transfer function (same as the transfer function 107 of FIG. 1) 149, a transfer function (same as the transfer function 109 of FIG. 1) 150, a gain $(g_3)$ 151, an adder 152, an adder 153, a gain $(1/G_n)$ 154, a gain $(G_n)$ 155, and an adder 156.

In this case, the torque detection unit 1 has a main function of detecting the torque from a torsional angle, and the viscosity coefficient $C_s$ is minute compared with the spring constant $K_s$. Then, even if such a consideration of approximating the viscosity coefficient $C_s$ by 0 is made, this approximation is a setting that is strict in terms of control stability, and poses no problem. Thus, in all embodiments, a description is given on the assumption that the viscosity coefficient $C_s$ is approximated by 0. It should be understood that even if a filter function is designed in consideration of the viscosity coefficient $C_s$, the same effect is provided.

Note that, a relational equation of the steering wheel rotational speed estimated value $\omega_h$ (hat), the torque-generation-unit rotational speed estimated value $\omega_m$ (hat), the detected torque estimated value TSM (hat), and the differential rotational speed $\omega_d$ is represented as Equation (23).

[Math. 23]

$$\begin{cases} \hat{\omega}_h = \dfrac{1}{J_{sw}s}\left\{\dfrac{g_1(\omega_m - \hat{\omega}_m)}{G_n} - T\hat{S}M\right\} \\ \hat{\omega}_m = \dfrac{1}{J_m s}\left\{g_2(\omega_m - \hat{\omega}_m) + \dfrac{T\hat{S}M}{G_n} + \tau_m\right\} \\ T\hat{S}M = -\dfrac{K_s}{s}\left\{g_3(\omega_m - \hat{\omega}_m) + \left(\dfrac{\hat{\omega}_m}{G_n} - \hat{\omega}_h\right)\right\} \\ \omega_d = \dfrac{G_n T\hat{S}M s}{K_s} \end{cases} \quad (23)$$

Moreover, from Equation (23), a characteristic equation of the observer is represented as Equation (24).

[Math. 24]

$$s^3 + a_2 s^2 + a_1 s + a_0 = 0 \quad (24)$$

$$\begin{cases} a_0 = \dfrac{K_s(g_1 + G_n^2 g_2)}{G_n^2 J_m J_{sw}} \\ a_1 = K_s\left(\dfrac{1}{J_{sw}} + \dfrac{1 - G_n g_3}{G_n^2 J_m}\right) \\ a_2 = \dfrac{g_2}{J_m} \end{cases}$$

In this case, in order to secure the control stability, solutions of Equation (24) only need to form a Butterworth pole pattern. Then, the characteristic equation of the observer satisfies Equation (25).

[Math. 25]

$$s^3 + 2\omega_b s^2 + 2\omega_b^2 s + \omega_b^3 = 0 \quad (25)$$

In other words, from the characteristic equations of Equation (24) and Equation (25), in order to secure the control stability, it is understood that the gain $g_1$, the gain $g_2$, and the gain $g_3$ only need to satisfy Equation (26).

[Math. 26]

$$\begin{cases} g_1 = \dfrac{\omega_b G_n^2 J_m(\omega_b^2 J_{sw} - 2K_s)}{K_s} \\ g_2 = 2 J_m \omega_b \\ g_3 = \dfrac{1}{G_n} + \dfrac{G_n J_m}{J_{sw}} - \dfrac{2\omega_b^2 G_n J_m}{K_s} \end{cases} \quad (26)$$

Moreover, from Equation (23) and Equation (26), the differential rotational speed $\omega_d$ only needs to be calculated from the torque-generation-unit rotational speed and the generated torque as represented by Equation (27).

[Math. 27]

$$\omega_d = \dfrac{\{2G_n^2 J_m J_{sw}\omega_b^2 - (J_{sw} + G_n^2 J_m)K_s\}s^3 +}{J_{sw}K_s(s^3 + 2\omega_b s^2 + 2\omega_b^2 s + \omega_b^3)}\omega_m + \dfrac{G_n^2\{(K_s - 2 J_{sw}\omega_b^2)s^2 + (2K_s\omega_b - J_{sw}\omega_b^3)s\}}{J_{sw}K_s(s^3 + 2\omega_b s^2 + 2\omega_b^2 s + \omega_b^3)}\tau_m \quad (27)$$

In this case, if $\omega_b$ representing the pole of the characteristic equation of Equation (25) is set to a value sufficiently higher than a speed control response frequency, influence by responsiveness of the observer on responsiveness of the speed control can be ignored.

A description is now given of an example of settings of the differential rotational speed calculation unit 22B and the torque control unit 31 illustrated in FIG. 11. In the differential rotational speed calculation unit 22B, the differential rotational speed $\omega_d$ between the steering wheel side and the torque generation unit side is calculated in accordance with Equation (23) based on the torque-generation-unit rotational speed detected by the rotational speed detection unit 4 and the generated torque command calculated by the torque control unit 31.

Moreover, in the torque control unit 31, the generated torque command directed to the actuator 32 is calculated by subtracting the compensation torque acquired by multiplying the differential rotational speed $\omega_d$ calculated by the differential rotational speed calculation unit 22B by the gain $K_{rp}$ from the assist torque command $\tau_{m0}$ acquired by the assist torque command calculation unit 21 as represented in Equation (7). At this time, as in the first embodiment, the gain $K_{rp}$ may be switched depending on the parameters such as the vehicle speed signal.

The related-art electric power steering control device disclosed in Patent Literature 1 only suppresses the vibration component included in the rotational speed on the torque generation unit side, and cannot suppress the differential rotational speed between the steering wheel side and the torque generation unit side, and hence there is such a problem that the driver feels uncomfortable torque vibration during the turning-back of the steering wheel and the like.

In contrast, according to the electric power steering control device of the fifth embodiment, such an effect can be provided that by setting the braking ratio to an appropriate value, without detecting the rotation information on the steering wheel side, the torque vibration generated by the differential rotational speed can be suppressed, which is not provided by the related art.

Moreover, according to the electric power steering control device of the fifth embodiment of the present invention, the differential rotational speed between the steering wheel side and the torque generation unit side is calculated based on the torque-generation-unit rotational speed detected by the rotational speed detection unit and the generated torque command calculated by the torque control unit, and such an effect can thus be provided that influence of a delay caused by the noise removal from the detected torque and the characteristic of the detected torque is eliminated, which is not provided by the related art.

Note that, in the fifth embodiment, as the differential rotational speed, the differential rotational speed on the axis of the torque generation unit 30 is used, but the configuration is not limited to this case. A differential rotational speed on the axis of the steering wheel 11 may be used to include a component corresponding to the conversion of the gain 110 by the gear ratio, to thereby acquire the same effect.

Moreover, in the fifth embodiment, the assist torque command is calculated in the assist torque command calculation unit 21 based only on the detected torque from the torque detection unit 1, but the configuration is not limited to this case. The same effect can also be provided by, in order to secure control stability, using a detected torque through a compensator constructed with signals such as the rotational speed, to thereby calculate the assist torque command.

Moreover, in the fifth embodiment, the detected torque TSM and the torque-generation-unit rotational speed $\omega_m$ have the negative correlation, but the configuration is not limited to this case. The same effect can also be provided in the electric power steering control device using the torque detection unit 1 having a positive correlation between the detected torque TSM and the torque-generation-unit rotational speed $\omega_m$.

The invention claimed is:

1. An electric power steering control device, comprising:
   a steering wheel to be operated by a driver;
   an actuator for generating a generated torque for assisting a torque generated by steering by the driver with the steering wheel;
   a torque sensor provided between the steering wheel and the actuator, for detecting a torsion generated between a steering wheel side and an actuator side as a detected torque; and
   a controller configured to:
      calculate, based on the detected torque, an assist torque command for assisting the steering by the driver;
      detect a rotational speed on the actuator side when the driver steers the steering wheel as an actuator side rotational speed; and
      calculate a difference in a rotational speed generated between the steering wheel side and the actuator side as a differential rotational speed,
   wherein the controller calculates the differential rotational speed based on the detected torque and the actuator side rotational speed, and
   wherein the controller controls the generated torque for assisting the torque generated by steering by the driver with the steering wheel based on a compensation torque, which is set depending on the assist torque command and the differential rotational speed.

2. The electric power steering control device according to claim 1, wherein the controller calculates the differential rotational speed based on a signal acquired by high-pass filtering the detected torque and a signal acquired by high-pass filtering the actuator side rotational speed.

3. The electric power steering control device according to claim 2, wherein the controller applies high-pass filtering of a second or higher order.

4. The electric power steering control device according to claim 3, wherein a cutoff frequency of the high-pass filtering in the controller is set to a value higher than a frequency at which the driver is enabled to steer the steering wheel.

5. The electric power steering control device according to claim 2, wherein a cutoff frequency of the high-pass filtering in the controller is set to a value higher than a frequency at which the driver is enabled to steer the steering wheel.

6. The electric power steering control device according to claim 1, further comprising:
   a first rotation information detection device for detecting rotation information on the steering wheel side when the driver steers the steering wheel as first rotation information; and
   a second rotation information detection device for detecting rotation information on the torque generation unit side when the driver steers the steering wheel as second rotation information,
   wherein the controller calculates the differential rotational speed based on the first rotation information and the second rotation information.

7. An electric power steering control device, comprising:
   a steering wheel to be operated by a driver;
   an actuator for generating a generated torque for assisting a torque generated by steering by the driver;
   a torque sensor provided between the steering wheel and the actuator, for detecting a torsion generated between a steering wheel side and an actuator side as a detected torque; and
   a controller configured to:
      calculate, based on the detected torque, an assist torque command for assisting the steering by the driver;
      detect a rotational speed on actuator side when the driver steers the steering wheel as actuator side rotational speed; and
      calculate a difference in a rotational speed generated between the steering wheel side and the actuator side as a differential rotational speed,
   wherein the controller calculates the differential rotational speed based on the generated torque and the actuator side rotational speed, and
   wherein the controller controls the generated torque for assisting the torque generated by steering by the driver with the steering wheel based on a compensation torque, which is set depending on the assist torque command and the differential rotational speed.

8. A control method for an electric power steering control device, the method comprising:
   detecting, by a torque sensor, as a detected torque, a torsion generated between a steering wheel steered by a driver and an actuator for generating a generated torque for assisting a torque generated by steering by the driver;
   calculating, by a processor, based on the detected torque, an assist torque command for assisting the steering by the driver with the steering wheel;
   detecting, by the processor, a rotational speed on an actuator side when the driver steers the steering wheel as an actuator side rotational speed;
   calculating, by the processor, based on the detected torque or the generated torque, and based on the actuator side rotational speed, a difference in a rotational speed generated between the steering wheel and the actuator side as a differential rotational speed; and
   controlling, by the processor, the generated torque for assisting the torque generated by steering by the driver with the steering wheel based on a compensation torque, which is set depending on the assist torque command and the differential rotational speed.

* * * * *